United States Patent Office 3,468,326
Patented Sept. 23, 1969

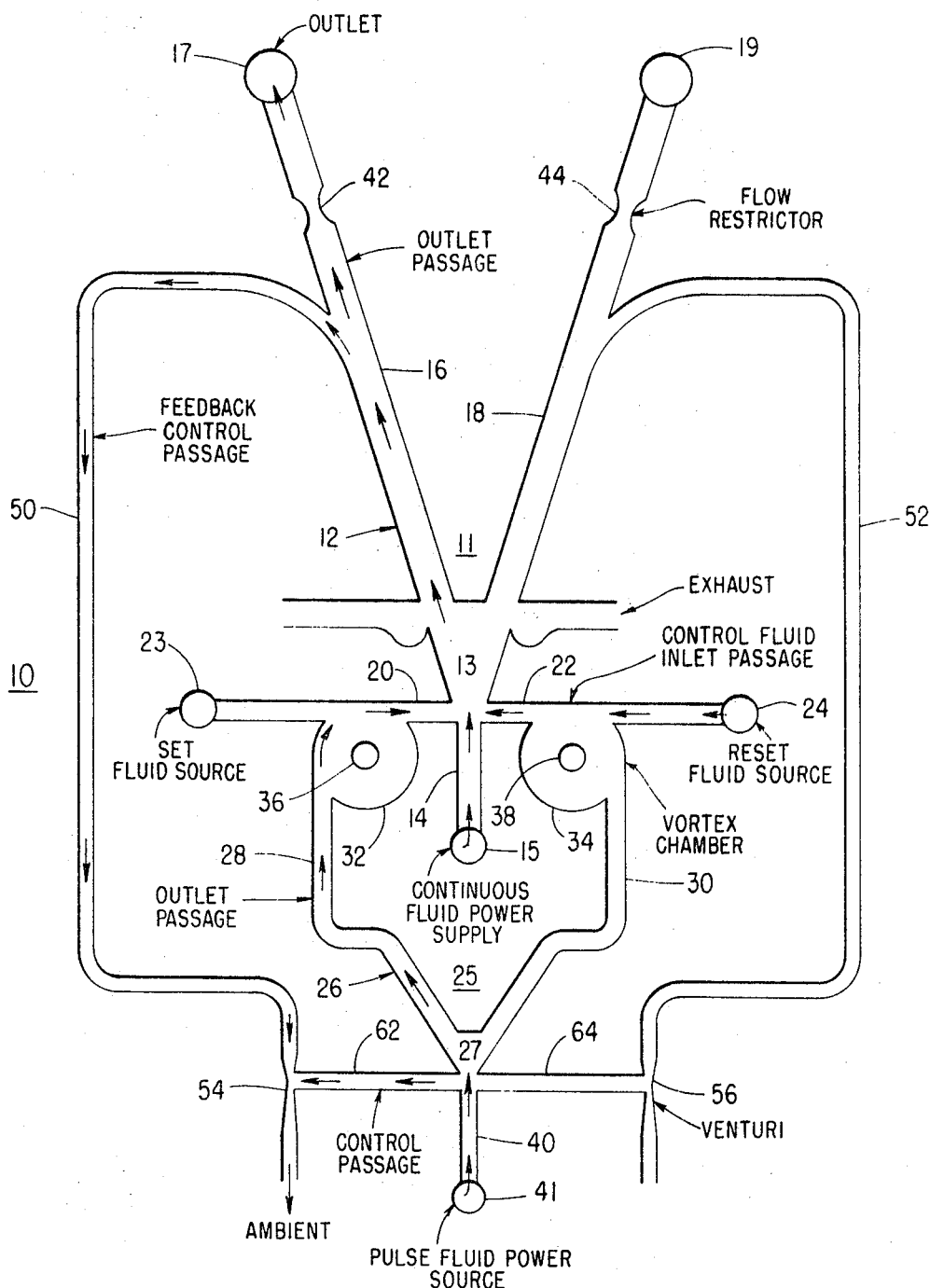

3,468,326
TRIGGERABLE FLIP-FLOP FLUID DEVICE
Kenneth W. Cohen, Chesterland, Ohio, assignor to
Bailey Meter Company, a corporation of Delaware
Filed Oct. 19, 1967, Ser. No. 676,472
Int. Cl. F15c 1/10
U.S. Cl. 137—81.5                                    4 Claims

ABSTRACT OF THE DISCLOSURE

A pure fluid device having a first bistable fluid element triggered by pulses supplied to the control inlets by the power outlets of a second bistable fluid element. Venturi sections are incorporated in feedback passages connected between the outlet passages of the first element and the control inlets of the second element. The venturis create a negative pressure in said control inlets when fluid is flowing in the feedback passages. Negative pressure diverts a pulsed power stream of the second element to a control inlet of the first element causing the first power stream to switch. The switching rate is determined by the rate at which fluid power pulses are emitted by the second bistable element.

BACKGROUND OF THE INVENTION

Field of the invention

The present invention relates generally to pure fluid devices requiring no moving mechanical parts for the operation thereof; and, more specifically, relates to a triggerable flip-flop fluid device for use as a binary counter stage in fluid digital computer systems.

Description of the prior art

The fluid logic flip-flop devices currently available can be categorized as being one of two general types; either the positive pressure-driven type, or the vacuum-driven type. The former type requires the crossing of feedback control fluid passages which creates the undesirable condition wherein the fluid passage configuration of the device cannot be etched or milled in a single geometric plane. Furthermore, the positive pressure-driven type does not regulate the magnitude of the control pressure established and thus is susceptible to complete loss of the fluid outlet stream when, due to blockage of the outlet stream passage, an overpressure feedback control signal drives the power stream into the second control passage. The vacuum-driven type, while establishing a single plane, fluid passage configuration, operates on the aspiration of air through control passages. This is undesirable because the pressure level for switching the power stream fluid will vary depending on the number of fluid devices connected in a circuit for, as the number of devices change, so will the switching pressure level.

SUMMARY OF THE INVENTION

The triggerable flip-flop fluid device which is the subject of the invention utilizes a first and second bistable fluid element in which each element has a primary input passage, control signal passages and outlet power fluid passages. The first element includes flow restrictors in the outlet passages to divert a portion of the outlet fluid flow through feedback passages and through a venturi section. The flow restrictor insures a feedback signal even when the fluid outlet passage is open. Control signal passages of the second element are connected at the throat of the venturi sections. Negative pressure created in the control passages of the second element by fluid flow through the venturis diverts pulsed power outputs from the second element through outlet passages which are connected to the control passages of the second element. Vented vortex chambers located between the outlet passages of the second element and control passages of the first elements limit the pressure signal entering the control passage as well as the aspiration of air by the first element to an atmospheric source provided by the vortex vent.

BRIEF DESCRIPTION OF THE DRAWING

The drawing is a schematic diagram of a pure fluid logic device incorporating the present invention.

DESCRIPTION OF THE PREFERRED EMBODIMENT

Referring to the drawing, the pure fluid logic device 10 of the present invention is illustrated as a fluid flow configuration consisting of a pattern of passages etched, milled, molded or cast in a suitable plate material. Since the construction of a pure fluid device is well known, the drawing shows only the passage configuration which defines the paths of fluid flow for the present invention.

Triggerable flip-flop fluid configuration 10 includes bistable fluid elements 11 and 25 which consist of fluid passage configurations 12 and 26 respectively. Bistable element 11 has a power fluid inlet passage 14 in communication with a pair of fluid outlet passages 16 and 18 and a pair of control fluid inlet passages 20 and 22. An interaction chamber 13 is formed by the intersection of said fluid passages. Fluid power, continuously transmitted through said power fluid inlet 14 by a source of continuous power stream 15, is diverted to either of the outlet passages 16 or 18 by the presence of a fluid control signal in either of the control passages 20 or 22. Passages 20 and 22 are located perpendicular to the power inlet 14 and are opposed with respect to each other.

The outlet passages 16 and 18 are arranged symmetrically with respect to the power fluid flow emanating from passage 14 such that in the absence of any control fluid flow from either passage 20 or 22, the power fluid arbitrarily flows through one of the outlet passages 16 or 18 and is not arranged to flow through any particular one of them.

Similarly, the bistable element 25 has a power fluid inlet passage 40 in communication with a pair of fluid outlet passages 28 and 30 and a pair of control fluid inlet passages 62 and 64. An interaction chamber 27 is formed by the intersection of said fluid passages. Fluid power intermittently introduced through said power inlet passage 40 by a source of pulsed fluid power 41 is diverted to either of the outlet passages 28 or 30 by a pressure condition existing in either of the control passages 62 or 64. Passages 62 and 64 are located perpendicular to the power inlet 40 and are opposed with respect to each other.

The outlet passages 28 and 30 are arranged symmetrically with respect to the pulsed power fluid flow emanating from inlet passage 40 such that in the absence of any control pressure in passages 62 and 64, the pulsed power will arbitrarily flow through one of the outlet passages 28 or 30 and is not arranged to flow through any particular one of them.

The control fluid sources 23 and 24, arbitrarily designated set and reset, provide control fluid flow in passages 20 and 22 respectively to establish flow of power fluid through either outlet passage 16 or 18. Outlet passages 16 and 18 include feedback passages 50 and 52 respectively. The feedback passages 50 and 52 and so arranged as to divert a portion of the power fluid flow in said respective outlet passages through venturi sections 54 and 56. Control passages 62 and 64 are connected to the throat of venturi sections 54 and 56 respectively such that the negative pressure developed in one of said passages as a result of fluid flow through the related venturi causes the pulsed power fluid to be diverted through a specific outlet passage of bistable element 25.

Outlet passage 28 of element 25 is connected to control inlet passage 20 of element 11 through vortex chamber 32. Vortex chamber 32 directs the pulsed fluid flow of outlet passage 28 through passage 20 to switch power fluid flow from outlet 16 to outlet 18 when feedback fluid flow through passage 50 establishes a negative pressure in control passage 62 of element 25. Vortex chamber 32 includes atmospheric vent 36 centrally located in one end of said vortex chamber to exhaust pulsed power fluid which is in excess of that required to switch the power fluid stream of element 11. Furthermore, vent 36 limits the aspiration of air by element 11 from element 25 by providing a source of atmospheric air, thereby reducing the need for a decoupling circuit which is normally required in conventional fluid devices to insure stable operation. The advantages of decoupling are well known to those skilled in the art.

Similarly, outlet passage 30 of element 25 is connected to control inlet passage 22 of element 11 through vortex chamber 34. Vortex chamber 34 directs the pulsed fluid flow of outlet passage 30 of element 25 through passage 22 to switch power fluid flow from outlet passage 18 to outlet passage 16 when feedback fluid flow through passage 52 establishes a negative pressure in control passage 64 of element 25. Vortex chamber 34 includes atmospheric vent 38 centrally located in one end of said vortex chamber to exhaust pulsed power fluid which is in excess of that required to switch the power fluid stream of element 11. Furthermore, vent 38 limits the aspiration of air by element 11 from element 25 by providing a source of atmospheric air, thereby reducing the need for a decoupling circuit as explained with reference to vent 36.

The portion of fluid flow in outlet passages 16 and 18 of element 11 which is diverted through the respective feedback control passages is determined by the size of flow restrictors 42 and 44 respectively. Flow restrictors 42 and 44 are sized to divert sufficient fluid flow through feedback passages 50 and 52 respectively to create sufficient negative pressure in control passages 62 and 64 to switch the pulsed power fluid between output passages of element 25. Flow restrictors 42 and 44 insure an adequate negative pressure whether the outlets 17 and 19 of element 11 are fully open or fully closed. In a typical switch cycle, fluid power directed through outlet passage 16 by a control signal from reset fluid source 24 will establish a feedback fluid flow in passage 50 as well as driving a fluid logic device connected to the outlet 17. Due to the well known Coanda, or boundary effect, the power fluid flow will remain in outlet passage 16 even though the reset signal is only a short pulse. The feedback fluid flow through venturi section 54 creates a negative pressure in control passage 62. A fluid pulse emanating from source 41 and passing through passage 40 will be diverted through outlet passage 28 due to the negative pressure in passage 62. The fluid pulse is directed through control passage 20 by vortex chamber 32 thereby causing the power fluid flow to switch from outlet passage 16 to outlet passage 18. This switch cycle is then reversed wherein a negative pressure created in control passage 64 causes a switch of power fluid from outlet passage 18 to outlet passage 16 when a fluid pulse is again emitted by source 41. Therefore, the switching rate of element 11 is determined by the rate at which source 41 emits fluid pulses and the time required to transmit fluid through feedback and outlet passages.

Furthermore, the switch condition established by the outlet pulses of element 25 may be changed at any time by initiating control fluid signals from either fluid source 23 or 24.

What I claim as new and desire to secure by Letters Patent of the United States is:

1. A pure fluid logic device comprising:
   first and second bistable fluid elements connected in a common geometric plane;
   said first bistable fluid logic element having a first power stream input passage connected to a fluid power source for establishing a continuous power stream, a first and second control fluid inlet passage for establishing first and second control stream fluid flows respectively cooperative with said power stream, first and second outlet passages each defining a path of fluid flow, a first interaction chamber formed by the intersection of said inlet and outlet passages, whereby said power stream may flow through either of said outlet passages in the absence of a control stream, and a first and second feedback control passage connected to said first and second outlet passages respectively;
   said second bistable fluid logic element having a second power stream input passage connected to a pulsed power stream source for providing a pulsed power stream, third and fourth control stream inlet passages connected to said first and second feedback control passages respectively for providing third and fourth control stream fluid flows respectively cooperative with said pulsed power stream, a third and fourth outlet passage connected to the first and second control fluid inlet passages respectively, and a second interaction chamber formed by the intersection of said inlet and outlet passages;
   a first venturi section located in said first feedback control passage; said third control stream inlet connected at the throat of said first venturi section;
   a second venturi section located in said second feedback control passage; said fourth control stream inlet connected at the throat of said second venturi section;
   whereby fluid flow in said first outlet passage caused by control stream fluid flow in the second control inlet acting on said continuous power stream will establish fluid flow in the first feedback control passage thereby creating a negative pressure in said third control inlet; said negative pressure will cause a fluid pulse emitted from said pulsed power source to be transmitted through the third fluid outlet which in turn will act on the continuous power stream through the first control inlet causing the continuous power stream to switch from the first fluid outlet to the second fluid outlet; a portion of the fluid flow in the second outlet is now diverted through the second feedback control passage and will result in a reverse switching operation when said pulsed power source emits another fluid pulse, the switch rate being controlled by the rate at which the pulsed power source emits pulses.

2. A pure fluid logic device as claimed in claim 1 further including a pair of flow restrictors; the first of said flow restrictors located in said first outlet passage at a position downstream of said first feedback control passage, the second flow restrictor located in said second outlet passage at a position downstream of said second feedback control passage, whereby a predetermined portion of the power fluid flow in said outlet passages is diverted through said feedback passages regardless of the outlet condition.

3. A pure fluid logic device as claimed in claim 1 further including a pair of cylindrical vortex chambers, each having an atmospheric vent in an end of said chambers; the first of said vortex chambers being located between the third outlet passage and the first control passage, the second vortex chamber being located between the fourth outlet passage and the second control passage, whereby said vented vortex chambers will exhaust fluid flow in excess of that required for switching the continuous power stream and, furthermore, will function as a decoupling circuit between said first and second bistable fluid logic elements.

4. A pure fluid logic device as claimed in claim 1 wherein said first and second control fluid inlet passages each include a control fluid inlet whereby the switch condition established by the pulsed power stream of said second bistable element may be changed at any time by introducing fluid flow at either of said control fluid inlets.

References Cited

UNITED STATES PATENTS

| | | | |
|---|---|---|---|
| 3,148,692 | 9/1964 | Seaton | 137—81.5 |
| 3,191,860 | 6/1965 | Wadey | 137—81.5 XR |
| 3,223,101 | 12/1965 | Bowles | 137—81.5 |
| 3,226,023 | 12/1965 | Horton | 137—81.5 XR |
| 3,277,913 | 10/1966 | Fox et al. | 137—81.5 |
| 3,417,770 | 12/1968 | Denison | 137—81.5 |

SAMUEL SCOTT, Primary Examiner